(12) United States Patent  
Brockway et al.

(10) Patent No.: US 12,112,467 B2
(45) Date of Patent: Oct. 8, 2024

(54) METHOD OF INSPECTING A FASTENER, AND A SYSTEM AND APPARATUS FOR INSPECTING A FASTENER

(71) Applicant: The Boeing Company, Chicago, IL (US)

(72) Inventors: Monica J. Brockway, Bothell, WA (US); Farahnaz Sisco, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 467 days.

(21) Appl. No.: 17/519,130

(22) Filed: Nov. 4, 2021

(65) Prior Publication Data
US 2022/0138928 A1    May 5, 2022

Related U.S. Application Data

(60) Provisional application No. 63/109,670, filed on Nov. 4, 2020.

(51) Int. Cl.
| | |
|---|---|
| *G06T 7/00* | (2017.01) |
| *B21J 15/28* | (2006.01) |
| *G01B 11/02* | (2006.01) |
| *G01N 21/88* | (2006.01) |
| *G01N 21/95* | (2006.01) |
| *G06T 7/70* | (2017.01) |
| *G06V 10/40* | (2022.01) |

(52) U.S. Cl.
CPC ............ *G06T 7/0004* (2013.01); *B21J 15/28* (2013.01); *G06T 7/70* (2017.01); *G06V 10/40* (2022.01)

(58) Field of Classification Search
CPC .......... G06T 7/0004; G06T 7/70; B21J 15/28; G06V 10/40; G01B 11/02; G01N 2021/8887; G01N 21/9515
See application file for complete search history.

(56) References Cited

U.S. PATENT DOCUMENTS

| | | | |
|---|---|---|---|
| 2004/0114133 A1 | 6/2004 | Furiya et al. | |
| 2014/0259600 A1 | 9/2014 | Kilibarda et al. | |
| 2018/0324908 A1* | 11/2018 | Denker | H05B 6/6467 |
| 2019/0072381 A1* | 3/2019 | Anderson | G06T 7/001 |
| 2020/0139425 A1 | 5/2020 | Auriol et al. | |
| 2022/0146256 A1* | 5/2022 | Engelbart | G01B 11/303 |
| 2023/0386008 A1* | 11/2023 | deNijs | B23C 3/12 |

FOREIGN PATENT DOCUMENTS

| | | | |
|---|---|---|---|
| CA | 3124778 A1 | 7/2020 | |
| EP | 2546022 A1 * | 1/2013 | ............ B21J 15/142 |
| EP | 2809072 A2 | 12/2014 | |
| EP | 4140615 A | 3/2023 | |
| JP | 2013-177760 A | 9/2013 | |

OTHER PUBLICATIONS

European Search Report for EPO Patent Application No. 21196990.2, mailed Feb. 18, 2022, 10 pages.
First Office Action for European Application No. 21196990.2, dated Aug. 18, 2023, 10 pages.

* cited by examiner

*Primary Examiner* — Asghar H Bilgrami
(74) *Attorney, Agent, or Firm* — Jordan IP Law, LLC

(57) ABSTRACT

One or more methods of inspecting one or more structural features of an installed fastener in a structure or substructure, and a manually-operated or automated inspection apparatus and an inspection system for inspecting one or more structural features of a fastener in a structure or substructure.

11 Claims, 8 Drawing Sheets

METHOD OF INSPECTING A FASTENER, AND A SYSTEM AND APPARATUS FOR INSPECTING A FASTENER

CROSS-REFERENCE TO RELATED APPLICATIONS

The present application claims the benefit of priority to U.S. Provisional Patent Application No. 63/109,670 (filed on Nov. 4, 2020), which is hereby incorporated by reference in its entirety.

FIELD

Embodiments relate generally to one or more methods of inspecting one or more structural features of an installed fastener in a structure or substructure. Embodiments also relate to a manually-operated or automated inspection apparatus and an inspection system for inspecting one or more structural features of a fastener in a structure or substructure.

BACKGROUND

In a manufacturing environment, such as, for example, the manufacture of aircraft, various parts or components are connected to each other to form structures or substructures. Installation of mechanical fasteners such as, for example, blind fasteners or one-side fasteners, is generally conducted in order that the fastener is in flush alignment (i.e., no gaps) to the surface of the part.

A blind fastener includes an internally threaded body and an externally threaded core bolt that passes through the internally threaded body. One end of the core bolt has an enlarged head, while the other end has an engaging portion. Rotation of the core bolt relative to the body causes axial movement of the core bolt in an outwardly direction from the body. Such axial movement thereby causes deformation of the body outwardly in a manner that forms a bulb that engages an inner surface of the part, thereby securing the blind fastener in place and attaching the parts to each other. When installing a blind fastener, a portion of the head of the core bolt typically fractures leaving a flush surface on the installed fastener head.

The structural integrity of the connection between parts that is facilitated by the fastener may be compromised in the event the fastener has variability in its shape or size and/or the fastening hole of the part(s) to be fastened are offset due to machining tolerances.

Inspection of installed fasteners such as, for example blind fasteners or one-side fasteners is often difficult, if not impossible due to the fact that the relatively tight access spaces and/or enclosed location of the fasteners make access to the "blind" side of the part(s) difficult and/or unavailable.

SUMMARY

In accordance with one or more embodiments, one or more methods are provided for inspecting one or more structural features (e.g., blind bulb, nut, collar, pin protrusion, thin sleeve protrusion) of a fastener previously installed in a fastening hole of a structure or substructure. Such methods serve the purpose of maintaining the structural integrity of any connection between parts that is facilitated by the fastener.

In accordance with one or more embodiments, the structural features include, but are not limited to, retention features of the installed fastener and other installed fasteners in an inspection environment external to the installed fastener. As used herein, the "retention feature(s)" includes a bulb portion of the fastener that engages an inner surface of the part forming the structure or substructure to maintain or secure the fastener in the fastening hole.

In accordance with one or more embodiments, provided herein is a manually-operated or automated apparatus and manually-operated or automated system for inspecting one or more structural features of a fastener in a structure or substructure. Such features for inspection include, but are not limited to, a fastener head, a blind fastener bulb, a nut-and-pin protrusion, a swaged collar, a bracket, an insert, a clip, a trimmed or machined feature, etc.

The inspection apparatus and inspection system are respectively configured for entry into/through a hole, notch, access opening, and the like. In an embodiment in which the inspection apparatus and inspection system is to inspect a blind fastener installation, the inspection apparatus and inspection system are respectively configured for entry into/through an adjacent drilled hole.

In accordance with one or more embodiments, a method of inspecting a fastener installed in a fastening hole of a region of a structure that is enclosed or has limited access comprises one or more of the following: positioning an inspection apparatus for entry along a longitudinal axis thereof through an adjacent fastening hole of the installed fastener to be inspected; and detecting structural features of one or more of the fastener and an inspection environment external to the fastener as inspection data.

In accordance with one or more embodiments, an inspection apparatus for inspecting a fastener installed in a fastening hole of a region of a structure that is enclosed or has limited access comprises one or more of the following: an inspection member, positioned for entry along a longitudinal axis thereof through an adjacent fastening hole of the installed fastener to be inspected; a sensor array, arranged in the inspection member, the sensor array comprising one or more sensors to detect structural features of one or more of the installed fastener and an inspection environment external to the installed fastener as inspection data; and a control module, arranged in the inspection member, the control module comprising one or more processors configured to control the inspection member and the sensor array.

In accordance with one or more embodiments, an inspection system for inspecting a fastener installed in a fastening hole of a region of a structure that is enclosed or has limited access comprises one or more of the following: an automation machine configured to conduct one or more of drilling one or more fastening holes in the structure, and installing a fastener in a corresponding fastening hole; and an inspection apparatus, operatively connected to the automation machine, the inspection apparatus including: an inspection member, positioned for entry along a longitudinal axis thereof through an adjacent fastening hole of the installed fastener to be inspected; and a sensor array, arranged in the inspection member, the sensor array comprising one or more sensors to detect structural features of one or more of the installed fastener and an inspection environment external to the installed fastener as inspection data; and a control module, arranged in the inspection member, the control module comprising one or more processors configured to control the inspection member and the sensor array.

In accordance with one or more embodiments, a computing system for inspecting a fastener installed in a fastening hole of a region of a structure that is enclosed or has limited access comprises one or more of the following: one or more processors configured to: causing an inspection member, to detect structural features of one or more of the installed fastener and an inspection environment external to the installed fastener as inspection data; and controlling an inspection member and the sensor array.

Practice of one or more methods, apparatus, and systems set forth, described, and/or illustrated herein facilitates via an adjacent fastener hole, non-invasive inspection of one or more structural features of a fastener previously installed in a fastening hole of a structure or substructure, and/or an inspection environment external to the fastener.

The features, functions, and advantages that have been discussed are achieved independently in various embodiments or, are combined in yet other embodiments further details of which is seen with reference to the following description and drawings.

DRAWINGS

The various advantages of the embodiments of the present disclosure will become apparent to one skilled in the art by reading the following specification and appended claims, and by referencing the following drawings, in which:

Figure 9:
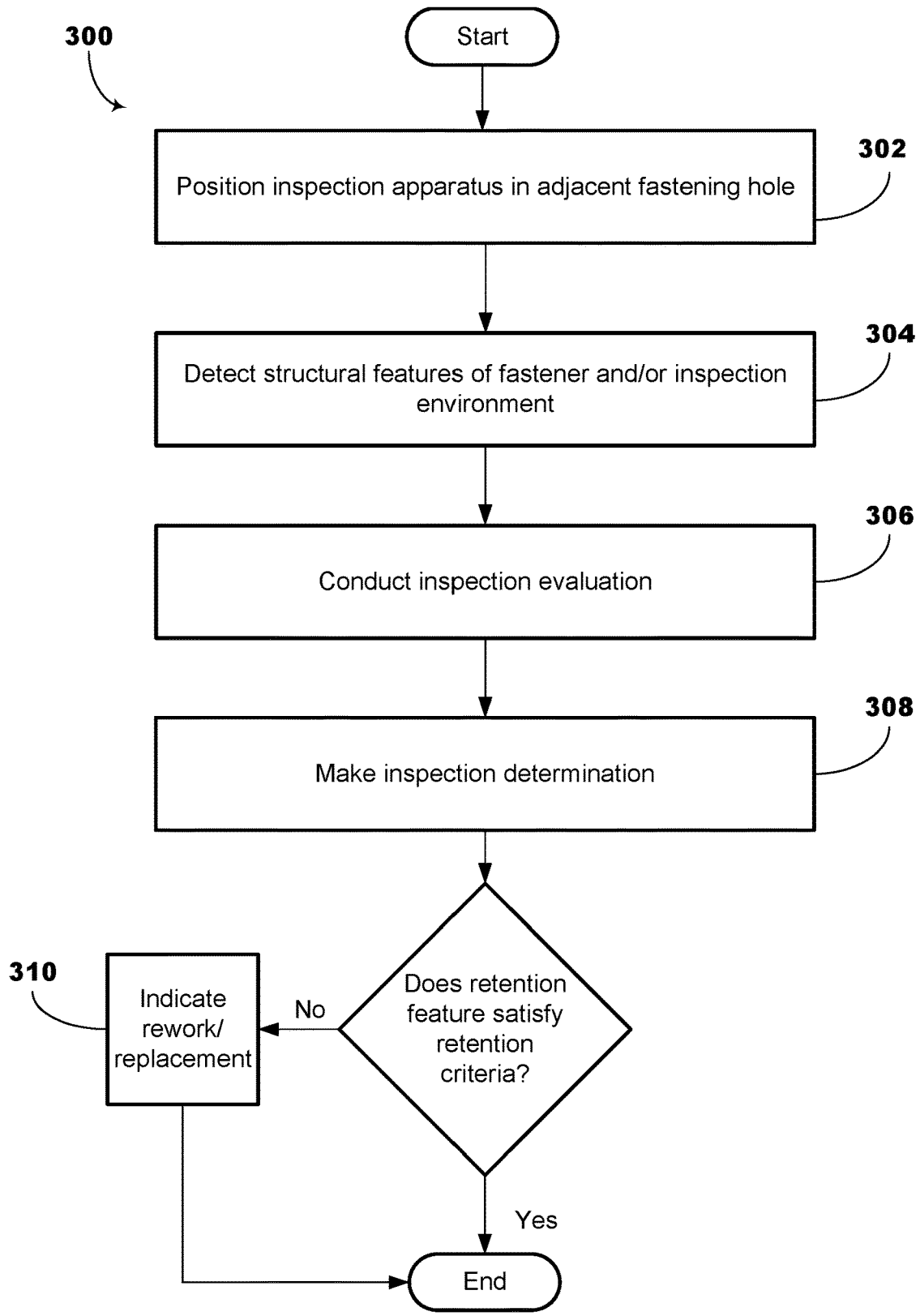

FIG. 9 schematically illustrates advantageous embodiment operations performed by one or more embodiments to inspect a fastener installed in a fastening hole of a structure.

DESCRIPTION

As illustrated in FIG. 1 to 8, in accordance with one or more embodiments, a manually-operated or automated inspection apparatus 10, 100 and a manually-operated or automated inspection system 200 for inspecting one or more structural features of a fastener in a structure or substructure. Such features for inspection include, but are not limited to, a fastener head, a blind fastener bulb, a nut-and-pin protrusion, a swaged collar, a bracket, an insert, a clip, a trimmed or machined feature, etc.

In accordance with one or more embodiments, the inspection apparatus 10, 100 and the inspection system 200 for inspection of a fastener F, such as, for example, a blind fastener or a one-side fastener, that has been previously installed in a fastening hole HF of a structure S that includes an upper structure region SU and a lower structure region SL. Each inspection apparatus 10, 100 respectively comprises an inspection member 20, 120 having at least one region thereof sized for entry into or receipt through an adjacent fastening hole HA or structure of the fastener F to be inspected or another fastener or structure S2 to be inspected. Alternatively or additionally, the inspection apparatus 10, 100 and the inspection system 200 are respectively used for installation verification or any inspection in the process.

Figure 4:
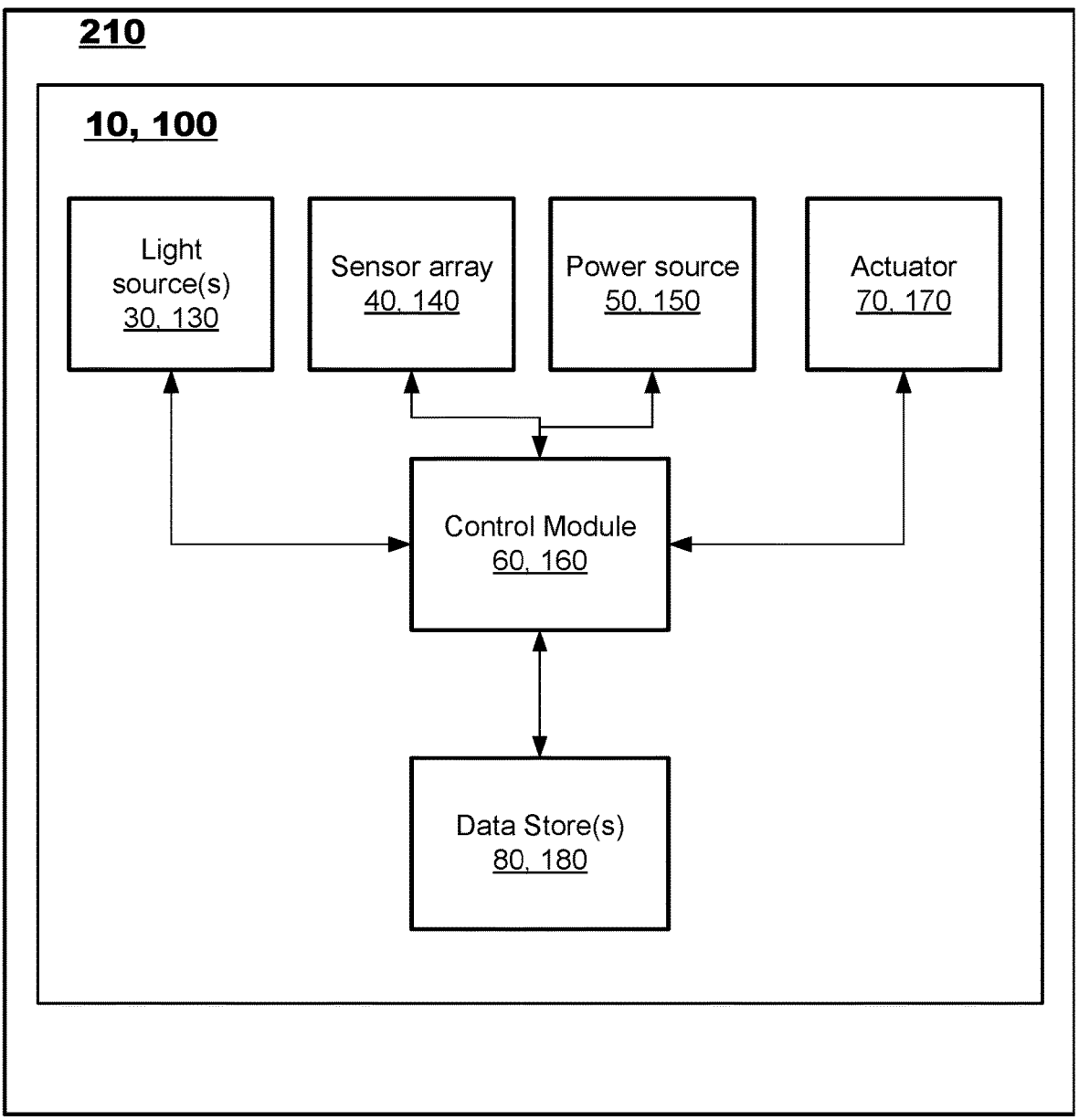
FIG. 4 illustrates an advantageous embodiment of an inspection system.
Figure 5:
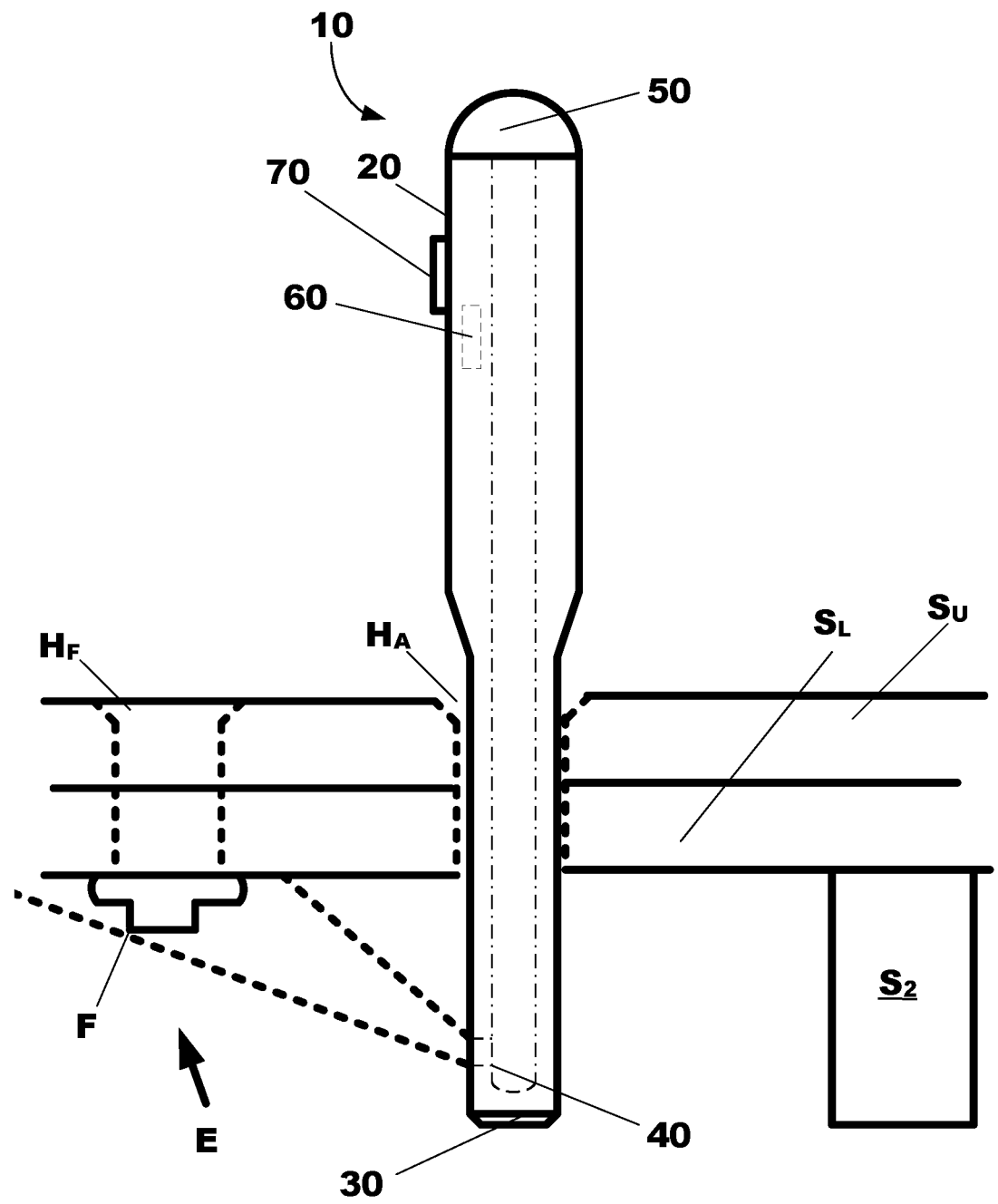
FIG. 5 illustrates the inspection apparatus of FIG. 1 inspecting a fastener received in a fastening hole of a structure.
Figure 6:
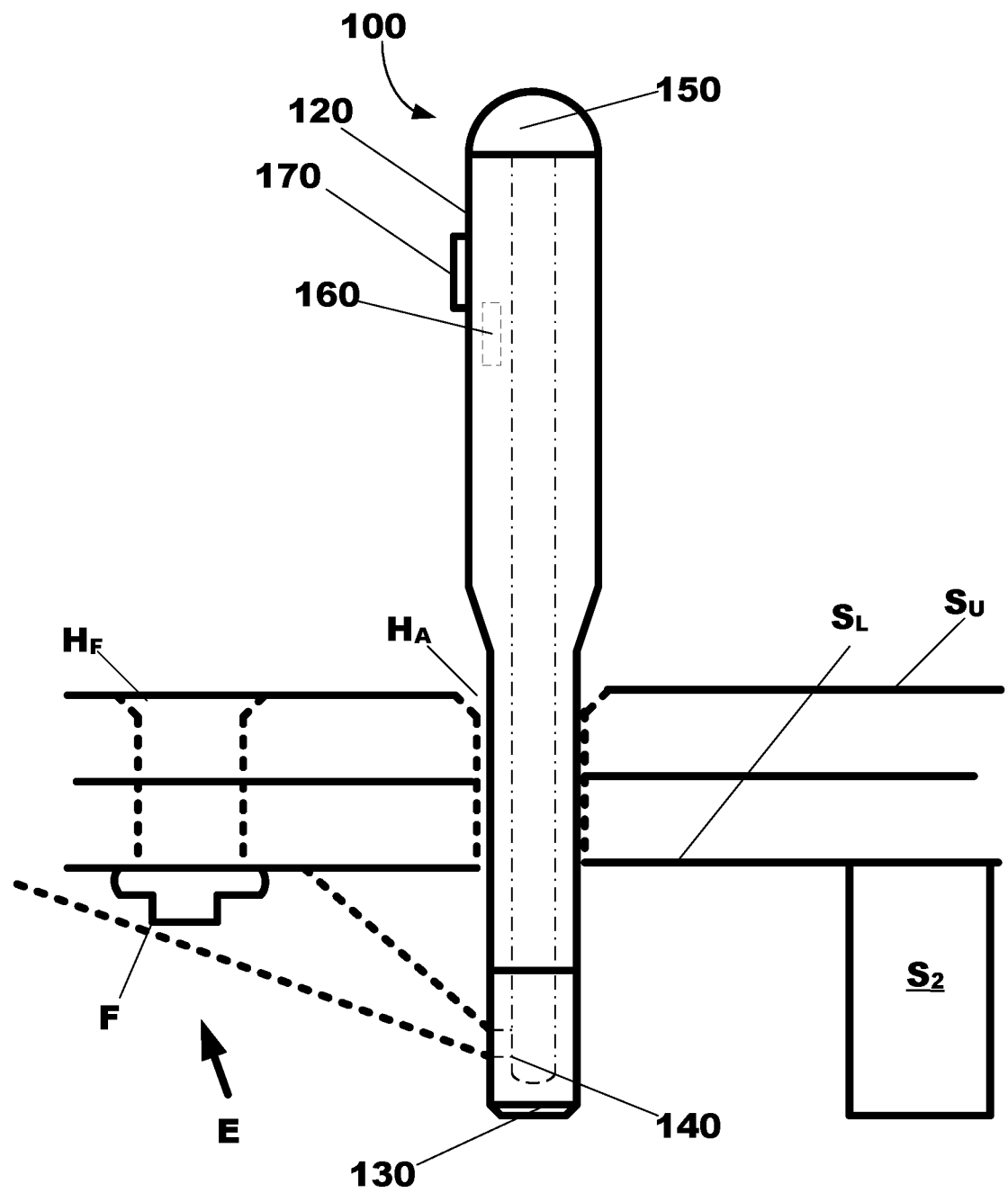
FIG. 6 illustrates the inspection apparatus of FIG. 2 inspecting a fastener received in a fastening hole of a structure.
Figure 7:
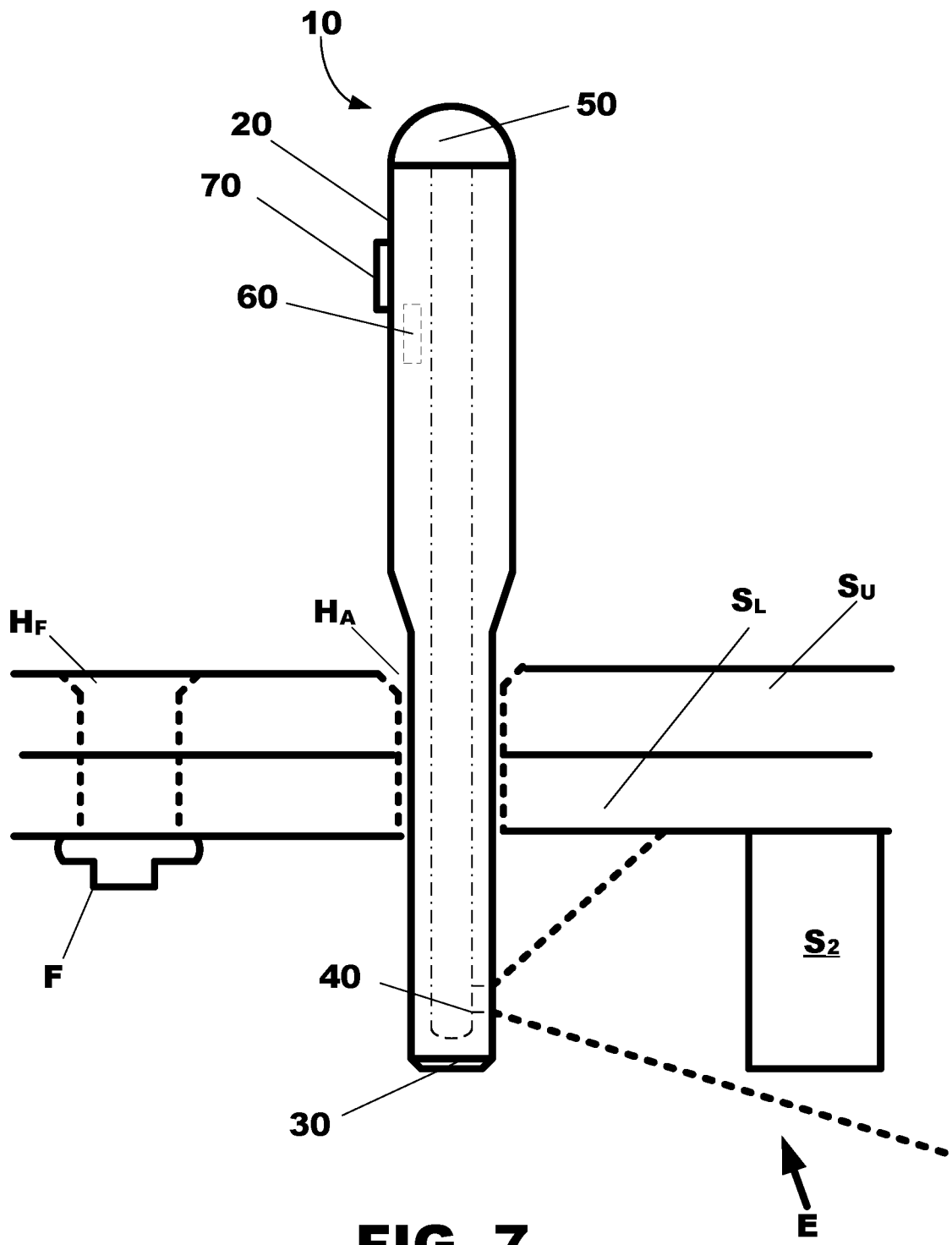
FIG. 7 illustrates the inspection apparatus of FIG. 1 inspecting an adjacent structure.
Figure 8:
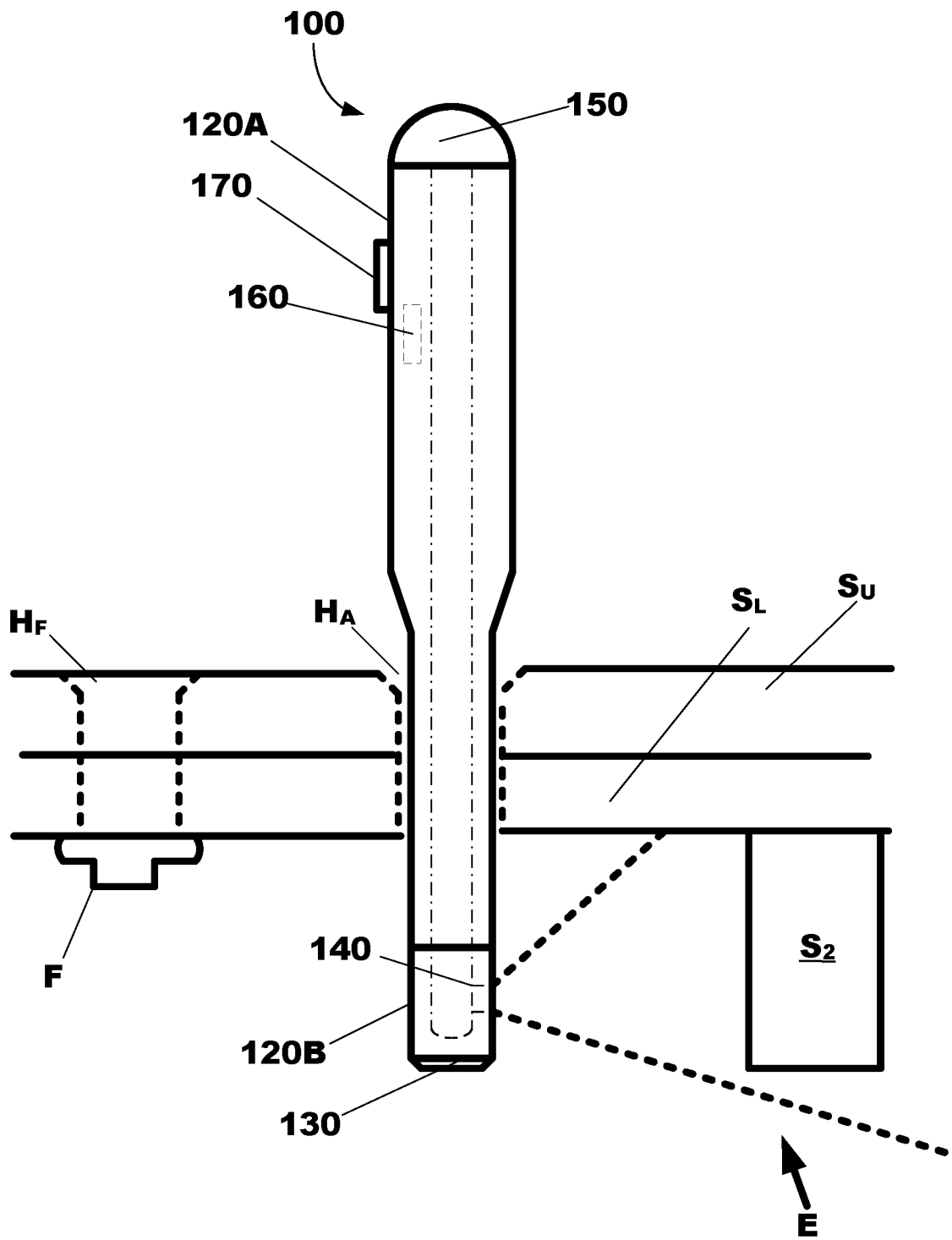
FIG. 8 illustrates the inspection apparatus of FIG. 2 inspecting an adjacent structure.

The inspection member 20, 120 comprises a body that is configured for hand operation by a user for rework, maintenance, and/or in-service inspections. The inspection member 20, 120 has a portable, compact structural configuration that permits manual and/or automated inspection in tightly confined or enclosed inspection regions of a structure. This disclosure contemplates the inspection member 20, 120 having any suitable structural configuration that falls within the spirit and scope of the principles of this disclosure set forth herein. For example, as illustrated in FIG. 4, the inspection apparatus 10, 100 is configured for incorporation into an automation machine 210 to form an inspection system 200. The automation machine 210 is configured to have one or more other functions, such as, for example, drilling and fastening, or machining or assembly.

Figure 1:
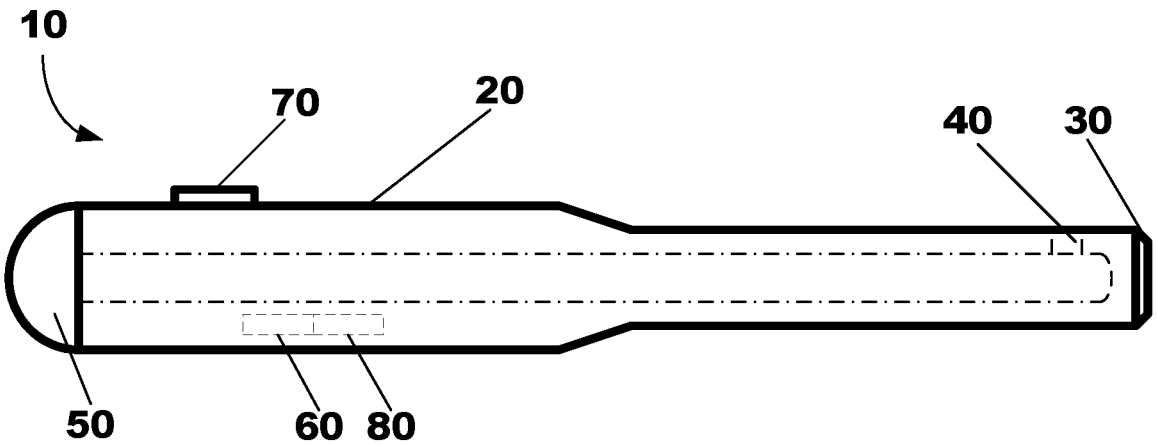
FIG. 1 illustrates an advantageous embodiment of an inspection apparatus.
Figure 2:
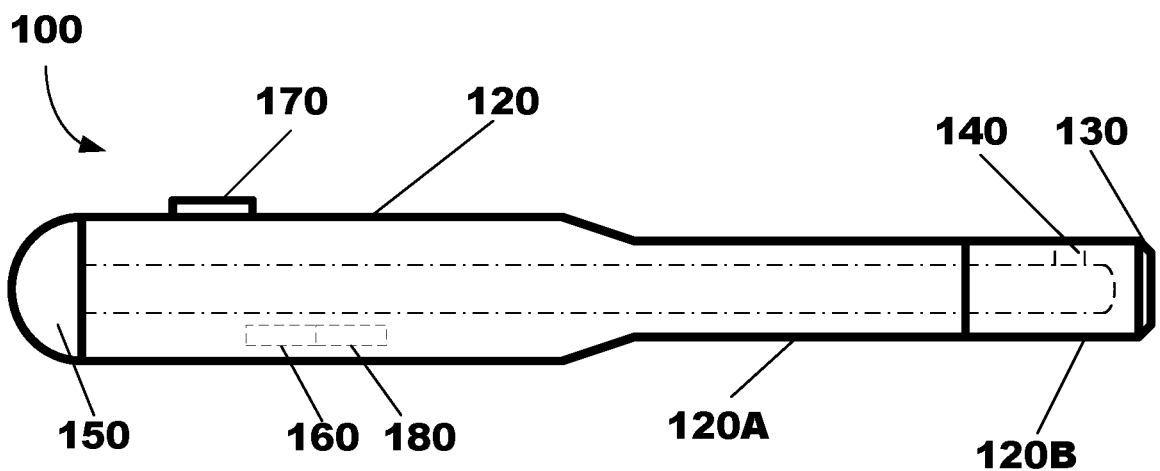
FIG. 2 illustrates an advantageous embodiment of an inspection apparatus.

As illustrated in FIG. 2, the inspection member 120 has one or more regions, to include, for example, a base region 120A and an inspection region 120B extending longitudinally from the base region 120A. The base region 120A and the inspection region 120B are operatively connected to permit selective rotation of the inspection region 120B about the longitudinal axis of the inspection member 120 and independent of the base region 120A.

The inspection apparatus 10, 100 further comprises one or more light source(s) 30, 130, a sensor array 40, 140, a power source 50, 150 (e.g., a battery), an actuator 70, 170 to manually activate the light source(s) 30, 130 and/or sensor array 40, 140, a control module 60, 160, and one or more data stores 80, 180.

The one or more light source(s) 30, 130 are configured to emit illuminating light to the fastener F and an inspection environment E external to the fastener F. The inspection environment E comprises one or more of the upper structure region SU, the lower structure region SL, another structure S2 (See, FIGS. 7 and 8) and one or more fasteners.

In accordance with one or more embodiments, the light source(s) 30, 130 comprises one or more LEDs operatively connected to a printed circuit board (PCB) mounted in an interior of the inspection member 20, 120, and the control module 60, 160 to control an operating mode of one or more of the light source(s) 30, 130, the sensor array 40, 140, the power source 50, 150, and the actuator 70, 170. The light source(s) 30, 130 are arranged, mounted, or otherwise positioned at any suitable location with respect to the inspection member 20, 120. For example, one or more LEDs are located within an interior space of the inspection member 20, 120, and/or one or more LEDs are located on an exterior surface of the inspection member 20, 120. It will be understood that this disclosure contemplates that the one or more LEDs are configured to be arranged, mounted, or otherwise positioned in any suitable that fall within the spirit and scope of the principles of this disclosure set forth herein.

In accordance with one or more embodiments, one or more LEDs in the are configured for manual control by a user and/or automatic control by the control module 60, 160 to simultaneously or sequentially emit illuminating light to one or more fasteners F and one or more inspection environments E in which the fasteners F are located. For example, one or more LEDs are configured for mounting spaced apart from each other vertically along the longitudinal axis of the inspection member 20, 120. Alternatively or additionally, one or more LEDs are configured for mounting spaced apart from each other radially around the longitudinal axis of the inspection member 20, 120.

The inspection member 20, 120 are configured for manual control by a user or automatic control by the control module 60, 160 to selectively rotate (e.g., between 0 to 360°) about its longitudinal axis to change an orientation of the light source(s) 30, 130 during the inspection. For example, in an automated operating mode of the inspection apparatus 10, 100, the control module 60, 160 is to cause selective rotation of the inspection region 120B about the longitudinal axis of the inspection member 120 and independent of the base region 120A.

The sensor array 40, 140 comprises one or more sensors configured to, at least during operation of the inspection apparatus 10, 100 detect, determine, assess, monitor, measure, quantify, and/or sense information about one or more of: the fastener F, the inspection environment E, other fasteners, and another structure S2. As set forth, described, and/or illustrated herein, "sensor" means any device, component, and/or system that is to perform one or more of detecting, determining, assessing, monitoring, measuring, quantifying, and sensing one or more things in the inspection environment.

The information comprises inspection data of the illuminated fastener F and the illuminated inspection environment E. To preserve the image quality provided by the sensor array 40, 140 particularly in dark inspection regions, the brightness or illuminating intensity of light emitted by the light source(s) 30, 130 is configured for dynamic adjustment by the control module 60, 160. The inspection member 20, 120 is configured for manual rotation and/or automated rotation about its longitudinal axis to change an orientation of the sensor array 40, 140 during the inspection.

In accordance with one or more embodiments, the sensor array 40, 140 comprises one or more sensors including, but not limited to, infrared sensors, proximity/position sensors, laser sensors, ultraviolet sensors, heat sensors, and image sensors (e.g., cameras). The image sensor(s) include an angled mirror to further facilitate compact arrangements which permit viewing of the fastener F, the inspection environment E, etc. The sensor array 40, 140 is configured for manual control by a user and/or automatic control by the control module 60, 160 to detect, determine, assess, monitor, measure, quantify, and/or sense information about the inspection environment E in which the fastener F is located, including information about other fasteners and/or structures S2 in the inspection environment E. It will be understood that this disclosure contemplates that the sensor array 40 comprises other types of sensors that fall within the spirit and scope of the principles of this disclosure set forth herein.

The sensor array 40, 140 is configured to be arranged, mounted, or otherwise positioned at any suitable location with respect to the inspection member 20, 120. For example, one or more sensors are configured for location or positioning within an interior space of the inspection member 20, 120 and/or one or more sensors are configured for location or positioning on an exterior surface of the inspection member 20, 120. It will be understood that this disclosure contemplates that the one or more sensors are configured to be arranged, mounted, or otherwise positioned in any suitable that fall within the spirit and scope of the principles of this disclosure set forth herein.

In accordance with one or more embodiments, one or more sensors in the sensor array 40, 140 are configured for manual control by a user or automatic control by the control module 60, 160 to simultaneously or sequentially detect, determine, assess, monitor, measure, quantify, and/or sense information about one or more fasteners F and one or more inspection environments E in which the fasteners F are located. For example, one or more sensors of the sensor array 40, 140 are configured for mounting spaced apart from each other vertically along the longitudinal axis of the inspection member 20, 120. Alternatively or additionally, one or more sensors of the sensor array 40, 140 are configured for mounting spaced apart from each other radially around the longitudinal axis of the inspection member 20, 120.

In accordance with one or more embodiments, the one or more sensors of the sensor array 40, 140 are configured for manual control manually by a user or automatic control by the control module 60, 160 to operate independently from each other, or alternatively, in combination with each other. The one or more sensors in the sensor array 40, 140 are configured for use in any combination, and are configured for use redundantly to validate and improve the accuracy of the sensor array 40, 140.

In accordance with one or more embodiments, the inspection data comprises one or more of image data, measurement data, and spatial proximity/position data of the fastener F, the inspection environment E, another fastener, and/or another structure S2. Embodiments, however, are not limited thereto, and thus, this disclosure contemplates the inspection data comprising any information corresponding to one or more structural features (e.g., blind bulb, nut, collar, pin protrusion, thin sleeve protrusion, a fastener head, a nut-and-pin protrusion, a swaged collar, a bracket, an insert, a clip, a trimmed or machined feature, etc.) and spatial relationship(s) between the fastener F and the inspection environment E that falls within the spirit and scope of the principles of this disclosure set forth herein. In one or more embodiments, the inspection data is to correspond to the dimensions (e.g., diameter, thickness, and/or height) of one or more structural features, such as, for example, a retention feature or bulb feature of the fastener F.

Alternatively or additionally, the inspection data is to correspond to the structural dimensions (e.g., diameter) of an adjacent fastening hole HA. For example, to measure the diameter of the hole HA, the apparatus 10, 100 is configured to make the hole diameter measurement (in a manual mode and/or an automated mode) by being caused to rotate simultaneously with moving forward linearly while entering the hole HA (e.g., before conducting the inspection), or while exiting from the hole HA (e.g., after conducting the inspection), or offset while entering into the hole HA, or offset while exiting from the hole HA. Alternatively or additionally, the inspection data is to correspond to an interface gap between the retention feature or bulb feature and the surface of the structure S.

Figure 3:
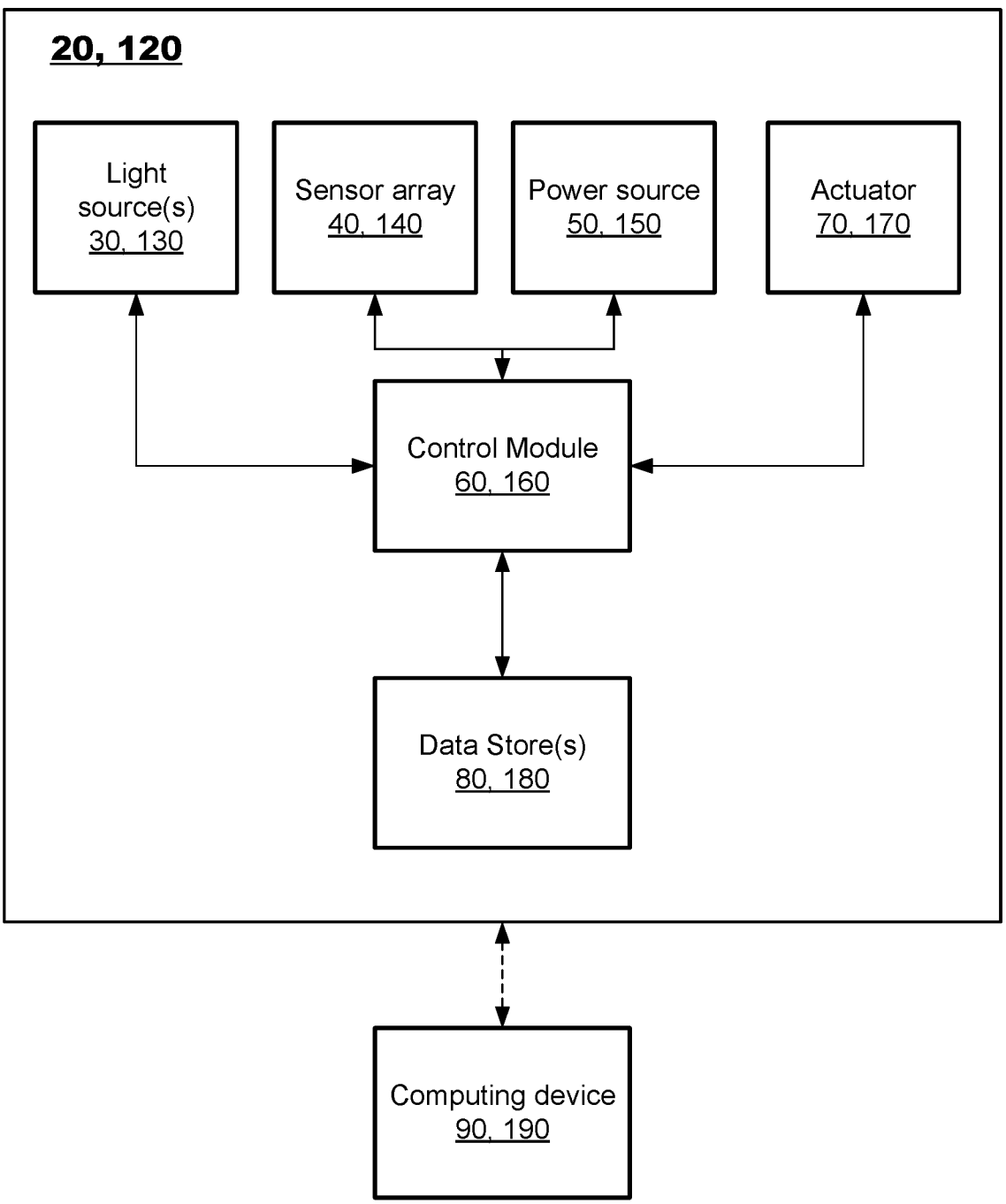
FIG. 3 illustrates the inspection apparatus of FIGS. 1 and 2.

As illustrated in FIG. 3, the control module 60, 160 is operatively connected to one or more data stores 80, 180. The control module 60, 160 includes a set of logic instructions executable by one or more processors of the control module 60, 160 or a source (e.g., a computing device 90, 190) arranged external to the control module 60, 160. Alternatively or additionally, the data stores 80, 180 contain such logic instructions. The logic instructions are configured to include one or more of assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In accordance with one or more embodiments, the one or more processors are configured to receive the inspection data, store the inspection data in the one or more data stores 80, 180, conduct an inspection evaluation of the inspection data, and make an inspection determination of one or more of the fastener F and the inspection environment E in response to the inspection evaluation.

For example, the inspection determination is to determine whether a bulb feature or retention feature of the fastener F satisfies one or more predetermined retention criteria stored in the one or more data stores 80, 180 or the external source (e.g., computing device 90, 190 or remote server).

In accordance with one or more embodiments, the inspection determination is to determine whether the fastener F contains surface defects or internal defects based on a comparison of the fastener F and predetermined threshold criteria stored in the one or more data stores 80, 180 or the external source (e.g., computing device 90, 190 or remote server). For example, the inspection determination is to determine whether the fastener F is damaged, or if an incorrect grip length for the fastener F was installed, or some other condition occurs that requires removal of the fastener F.

In accordance with one or more embodiments, the inspection determination is to determine whether the inspection environment E contains surface defects or internal defects based on a comparison of the inspection environment E and predetermined threshold criteria stored in the one or more data stores 80, 180 or the external source (e.g., computing device 90, 190 or remote server).

In accordance with one or more embodiments, the inspection evaluation comprises conducting a comparison, based on the image data from the sensor array 40, 140, of the fastener F and predetermined threshold image data stored in the one or more data stores 80, 180 or the external source (e.g., computing device 90, 190 or remote server).

In accordance with one or more embodiments, the inspection evaluation comprises conducting a comparison, based on the image data from the sensor array 40, 140, of the inspection environment E and predetermined threshold image data stored in the one or more data stores 80, 180 or the external source (e.g., computing device 90, 190 or remote server).

In accordance with one or more embodiments, the inspection evaluation comprises conducting a comparison, based on the measurement data from the sensor array 40, 140, of the fastener F with predetermined threshold measurement data stored in the one or more data stores 80, 180 or the external source (e.g., computing device 90, 190 or remote server).

In accordance with one or more embodiments, the inspection evaluation comprises conducting a comparison, based on the measurement data from the sensor array 40, 140, of the inspection environment E with predetermined threshold measurement data stored in the one or more data stores 80, 180 or the external source (e.g., computing device 90, 190 or remote server).

In accordance with one or more embodiments, the inspection evaluation comprises conducting a comparison, based on the measurement data from the sensor array 40, 140, of the adjacent fastening hole HA of the fastener F to be inspected with predetermined threshold measurement data stored in the one or more data stores 80, 180 or the external source (e.g., computing device 90, 190 or remote server). Such measurement data, for example, is derived prior to or upon entry of the inspection apparatus 10, 100 into the adjacent fastening hole HA.

In accordance with one or more embodiments, the inspection evaluation comprises conducting a comparison, based on the spatial proximity data, of the fastener F and predetermined threshold spatial proximity data stored in the one or more data stores 80, 180 or the external source (e.g., computing device 90, 190 or remote server).

In accordance with one or more embodiments, the inspection evaluation comprises conducting a comparison, based on the spatial proximity data, of the inspection environment E and predetermined threshold spatial proximity data stored in the one or more data stores 80, 180 or the external source (e.g., computing device 90, 190 or remote server).

FIG. 9 illustrates a flowchart of a method 300 of inspecting, via the inspection apparatus 10, 100 and/or the inspection system 200, a fastener installed in a fastening hole of a region of a structure that is enclosed or has limited access, in accordance with one or more embodiments.

In accordance with one or more embodiments, the method 300 is configured for implementation by the control module 60, 160 and/or the computing device 90, 190. For example, the control module 60, 160 and/or the computing device 90, 190 is configured to implement the method 300 using logic instructions (e.g., software), configurable logic, fixed-functionality hardware logic, etc., or any combination thereof. As an example, software executed on the control module 60, 160 and/or the computing device 90, 190 is to provide functionality described or illustrated herein. In particular, software executing on the control module 60, 160 and/or the computing device 90, 190 is to perform one or more fabrication or processing blocks of the method 300 set forth, described, and/or illustrated herein, or provides functionality set forth, described, and/or illustrated.

As illustrated in FIG. 9, the method 300 is to be initiated at illustrated process block 302, which include positioning an inspection apparatus for entry along a longitudinal axis thereof through an adjacent fastening hole of the installed fastener to be inspected. In accordance with one or more embodiments, positioning an inspection apparatus is to further comprise illuminating one or more of the installed fastener and the inspection environment external to the fastener.

The method 300 is to then proceed to illustrated process block 304, which includes detecting structural features of one or more of the fastener and an inspection environment external to the fastener as inspection data. In accordance with one or more embodiments, the inspection data comprises image data, measurement data, and position data of the installed fastener and the inspection environment.

The method 300 is to then proceed to illustrated process block 306, which includes, after detecting the structural features, conducting an inspection evaluation of the inspection data. In accordance with one or more embodiments, the inspection evaluation comprises conducting a comparison based on one or more of the image data, measurement data, and the position data, of a retention feature of the installed fastener with one or more predetermined threshold inspection data.

The method 300 is to then proceed to illustrated process block 306, which includes making an inspection determination of the installed fastener in response to the inspection evaluation. In accordance with one or more embodiments, the inspection determination comprises determining, in response to the inspection evaluation, whether the retention feature satisfies one or more predetermined retention criteria.

If "Yes," i.e., should the inspection determination conclude that the retention feature satisfies the predetermined retention criteria, the method 300 is to then terminate or end. In which case the inspection is to proceed to another installed fastener.

If "No," i.e., should the inspection determination conclude that the retention feature does not satisfy the predetermined retention criteria, the method proceeds to process block 310, where an indication (e.g., one or more of an audio, a visual, or a haptic) is made flagging/identifying the fastener, structure, etc. requires rework/replacement. The method 300 is to terminate or end after completion of illustrated process block 310.

Additional Notes and Examples

Example One includes a method of inspecting a fastener installed in a fastening hole of a region of a structure that is enclosed or has limited access, the method comprising: positioning an inspection apparatus for entry along a longitudinal axis thereof through an adjacent fastening hole of the installed fastener to be inspected; and detecting structural features of one or more of the fastener and an inspection environment external to the fastener as inspection data.

Example Two includes the method of Example One, further comprising, before detecting the structural features, illuminating one or more of the installed fastener and the inspection environment external to the fastener.

Example Three includes the method of Example One, further comprising generating image data, measurement data, and position data of the detected structural features of the installed fastener and the inspection environment.

Example Four includes the method of Example Three, further comprising, after detecting the structural features: conducting an inspection evaluation of the inspection data; and making an inspection determination of the installed fastener in response to the inspection evaluation.

Example Five includes the method of Example Four, wherein conducting the inspection evaluation comprises comparing the generated image data, measurement data, and position data of a retention feature of the installed fastener with one or more predetermined threshold inspection data.

Example Six includes the method of Example Five, wherein making the inspection determination comprises determining, in response to the inspection evaluation, whether the retention feature satisfies one or more predetermined retention criteria.

Example Seven includes an inspection apparatus for inspecting a fastener installed in a fastening hole of a region of a structure that is enclosed or has limited access, the inspection apparatus comprising: an inspection member, positioned for entry along a longitudinal axis thereof through an adjacent fastening hole of the installed fastener to be inspected; a sensor array, arranged in the inspection member, the sensor array comprising one or more sensors to detect structural features of one or more of the installed fastener and an inspection environment external to the installed fastener as inspection data; and a control module, arranged in the inspection member, the control module comprising one or more processors configured to control the inspection member and the sensor array.

Example Eight includes the inspection apparatus of Example Seven, further comprising one or more light sources, controlled by the control module, to illuminate the installed fastener and the inspection environment.

Example Nine includes the inspection apparatus of Example Eight, wherein the one or more processors configured to control the one or more light sources by dynamically adjusting an illuminating intensity of light emitted by the one or more light sources.

Example Ten includes the inspection apparatus of Example Seven, wherein the one or more processors configured to generate image data, measurement data, and position data of the detected structural features of the installed fastener and the inspection environment.

Example Eleven includes the inspection apparatus of Example Ten, wherein the one or more processors are configured to: conduct an inspection evaluation of the inspection data; and make an inspection determination of the fastener in response to the inspection evaluation.

Example Twelve includes the inspection apparatus of Example Eleven, wherein the one or more processors are configured to conduct the inspection evaluation by comparing the generated image data, measurement data, and position data of a retention feature of the installed fastener with one or more predetermined threshold inspection data.

Example Thirteen includes the inspection apparatus of Example Twelve, wherein the one or more processors are configured to make the inspection determination by determining, in response to the inspection evaluation, whether the retention feature satisfies one or more predetermined retention criteria.

Example Fourteen includes an inspection system for inspecting a fastener installed in a fastening hole of a region of a structure that is enclosed or has limited access, the inspection system comprising: an automation machine configured to conduct one or more of drilling one or more fastening holes in the structure, and installing a fastener in a corresponding fastening hole; and an inspection apparatus, operatively connected to the automation machine, the inspection apparatus including: an inspection member, positioned for entry along a longitudinal axis thereof through an adjacent fastening hole of the installed fastener to be inspected; and a sensor array, arranged in the inspection member, the sensor array comprising one or more sensors to detect structural features of one or more of the installed fastener and an inspection environment external to the installed fastener as inspection data; and a control module, arranged in the inspection member, the control module comprising one or more processors configured to control the inspection member and the sensor array.

Example Fifteen includes the inspection apparatus of Example Fourteen, wherein the inspection apparatus further includes one or more light sources, controlled by the control module, to illuminate the installed fastener and the inspection environment.

Example Sixteen includes the inspection apparatus of Example Fifteen, wherein the one or more processors configured to control the one or more light sources by dynamically adjusting an illuminating intensity of light emitted by the one or more light sources.

Example Seventeen includes the inspection apparatus of Example Sixteen, wherein the one or more processors configured to generate image data, measurement data, and position data of the detected structural features of the installed fastener and the inspection environment.

Example Eighteen includes the inspection apparatus of Example Seventeen, wherein the one or more processors are configured to: conduct an inspection evaluation of the inspection data; and make an inspection determination of the fastener in response to the inspection evaluation.

Example Nineteen includes the inspection apparatus of Example Eighteen, wherein the one or more processors are configured to conduct the inspection evaluation by comparing the generated image data, measurement data, and position data of a retention feature of the installed fastener with one or more predetermined threshold inspection data.

Example Twenty includes the inspection apparatus of Example Nineteen, wherein the one or more processors are configured to make the inspection determination by determining, in response to the inspection evaluation, whether the retention feature satisfies one or more predetermined retention criteria.

The terms "coupled," "attached," or "connected" used herein is to refer to any type of relationship, direct or indirect, between the components in question, and is to apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner.

Those skilled in the art will appreciate from the foregoing description that the broad techniques of the embodiments of the present disclosure is to be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of inspecting a fastener installed in a fastening hole of a region of a structure that is enclosed or has limited access, the method comprising:
    positioning an inspection apparatus for entry along a longitudinal axis thereof through an adjacent fastening hole of the installed fastener to be inspected;
    detecting structural features of one or more of the fastener and an inspection environment external to the fastener as inspection data that comprises image data, measurement data, and position data;
    conducting an inspection evaluation of the inspection data by conducting a comparison based on one or more of the image data, the measurement data, and the position data of a retention feature of the installed fastener with one or more predetermined threshold inspection data; and
    making an inspection determination of the installed fastener in response to the inspection evaluation.

2. The method of claim 1, further comprising, before detecting the structural features, illuminating one or more of the installed fastener and the inspection environment external to the fastener.

3. The method of claim 1, wherein the inspection determination comprises determining, in response to the inspection evaluation, whether the retention feature satisfies one or more predetermined retention criteria.

4. An inspection apparatus for inspecting a fastener installed in a fastening hole of a region of a structure that is enclosed or has limited access, the inspection apparatus comprising:
    an inspection member, positioned for entry along a longitudinal axis thereof through an adjacent fastening hole of the installed fastener to be inspected;
    a sensor array, arranged in the inspection member, the sensor array comprising one or more sensors to detect structural features of one or more of the installed fastener and an inspection environment external to the installed fastener as inspection data that comprises image data, measurement data, and position data; and
    a control module, arranged in the inspection member, the control module comprising one or more processors configured to control the inspection member and the sensor array, conduct an inspection evaluation of the inspection data by conducting a comparison based on one or more of the image data, the measurement data, and the position data of a retention feature of the installed fastener with one or more predetermined threshold inspection data, and make an inspection determination of the installed fastener in response to the inspection evaluation.

5. The inspection apparatus of claim 4, further comprising one or more light sources, controlled by the control module, to illuminate the installed fastener and the inspection environment.

6. The inspection apparatus of claim 5, wherein the one or more processors configured to control the one or more light sources by dynamically adjusting an illuminating intensity of light emitted by the one or more light sources.

7. The inspection apparatus of claim 5, wherein the inspection determination comprises determining, in response to the inspection evaluation, whether the retention feature satisfies one or more predetermined retention criteria.

8. An inspection system for inspecting a fastener installed in a fastening hole of a region of a structure that is enclosed or has limited access, the inspection system comprising:
    an automation machine configured to conduct one or more of drilling one or more fastening holes in the structure, and installing a fastener in a corresponding fastening hole; and
    an inspection apparatus, operatively connected to the automation machine, the inspection apparatus including:
        an inspection member, positioned for entry along a longitudinal axis thereof through an adjacent fastening hole of the installed fastener to be inspected; and
        a sensor array, arranged in the inspection member, the sensor array comprising one or more sensors to detect structural features of one or more of the installed fastener and an inspection environment external to the installed fastener as inspection data that comprises image data, measurement data, and position data; and
        a control module, arranged in the inspection member, the control module comprising one or more processors configured to control the inspection member and the sensor array, conduct an inspection evaluation of the inspection data by conducting a comparison based on one or more of the image data, the measurement data, and the position data of a retention feature of the installed fastener with one or more predetermined threshold inspection data, and make an inspection determination of the installed fastener in response to the inspection evaluation.

9. The inspection system of claim 8, wherein the inspection apparatus further includes one or more light sources, controlled by the control module, to illuminate the installed fastener and the inspection environment.

10. The inspection system of claim 9, wherein the one or more processors configured to control the one or more light sources by dynamically adjusting an illuminating intensity of light emitted by the one or more light sources.

11. The inspection system of claim 8, wherein the inspection determination comprises determining, in response to the inspection evaluation, whether the retention feature satisfies one or more predetermined retention criteria.

\* \* \* \* \*